United States Patent
Fukunaga et al.

(10) Patent No.: US 6,607,018 B1
(45) Date of Patent: Aug. 19, 2003

(54) PNEUMATIC TIRE HAVING TREAD INCLUDING INBOARD SIDE AREA AND OUTBOARD SIDE AREA

(75) Inventors: Takayuki Fukunaga, Tokyo (JP); Jun Matsuzaki, Tokyo (JP); Makoto Ishiyama, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 111 days.

(21) Appl. No.: 09/688,252

(22) Filed: Oct. 16, 2000

(30) Foreign Application Priority Data

Oct. 25, 1999 (JP) ............................. 11-302753

(51) Int. Cl.[7] ..................... B60C 11/03; B60C 11/11; B60C 111/00
(52) U.S. Cl. ................. 152/209.8; 152/209.9; 152/904
(58) Field of Search .................... 152/209.8, 209.9, 152/209.28, 904; D12/517, 527, 528, 559, 560, 561

(56) References Cited

U.S. PATENT DOCUMENTS

| | | | |
|---|---|---|---|
| 4,057,089 A | | 11/1977 | Johannsen |
| 4,456,046 A | * | 6/1984 | Miller |
| 4,884,607 A | * | 12/1989 | Mori |
| 4,913,208 A | * | 4/1990 | Anderson et al. |
| 4,984,616 A | * | 1/1991 | Shepler et al. |
| 5,291,929 A | * | 3/1994 | Daisho et al. |
| 5,329,980 A | * | 7/1994 | Swift et al. |
| 5,421,391 A | * | 6/1995 | Himuro |
| 5,425,406 A | * | 6/1995 | Swift et al. |
| 5,603,785 A | | 2/1997 | Weber et al. |
| D388,753 S | * | 1/1998 | Brayer et al. |
| D405,732 S | * | 2/1999 | Johenning et al. |
| 5,954,107 A | * | 9/1999 | Kuze et al. |
| 5,967,210 A | * | 10/1999 | Himuro |

FOREIGN PATENT DOCUMENTS

| | | | |
|---|---|---|---|
| EP | 0 346 781 A2 | | 12/1989 |
| EP | 812708 | * | 12/1997 |
| JP | 2-212202 | * | 8/1990 |
| JP | 4-215504 | * | 8/1992 |
| JP | 7-215013 | * | 8/1995 |

* cited by examiner

Primary Examiner—Steven D. Maki
(74) Attorney, Agent, or Firm—Sughrue Mion, PLLC

(57) ABSTRACT

A pneumatic tire. A central circumferential main groove is disposed to extend along a tire circumferential direction, along a ground contact center line of tread of the pneumatic tire. Inboard side circumferential main grooves and inboard side lateral main grooves, which are continuous with the central circumferential main groove, are provided at an inboard side of the ground contact center line. Outboard side lateral main grooves, which are continuous with the central circumferential main groove, and outboard side slanted longitudinal main grooves, which are continuous with the outboard side lateral main grooves, are disposed at an outboard side of the ground contact center line. Thus, irregular wear of land portions is continuously suppressed and controlling stability is improved. Moreover, water at the ground contact center line, which water is difficult to drain, can be efficiently drained from the ground contact area due to less water resistance. In short, the present invention enables a pneumatic tire with improved tire wear resistance, high wet condition drainage ability and improved controlling stability.

7 Claims, 2 Drawing Sheets

FIG. 2
PRIOR ART

PNEUMATIC TIRE HAVING TREAD INCLUDING INBOARD SIDE AREA AND OUTBOARD SIDE AREA

BACKGROUND OF THE INVENTION

1. Field of the Invention

The present invention relates to a pneumatic tire, and more particularly, to a pneumatic tire suitable for a high performance vehicle, in which wet condition drainage ability, controlling stability and tire wear resistance can be altogether improved without detracting from other tire properties.

2. Description of the Related Art

Conventionally, in order to suppress the occurrence of hydroplaning during high speed running, a plurality of straight line grooves extending along a direction of travel, i.e. along a circumferential direction of a tire, are disposed at a vicinity of a tire center line.

However, when a relatively large number of straight line grooves, are formed so as to suppress the occurrence of hydroplaning, ground contact area is reduced and impairment of dry condition properties becomes a problem.

Recently, moreover, as vehicle performance has risen, there has been demand in the market for further improvements in wet condition running properties.

SUMMARY OF THE INVENTION

The present invention is provided to solve the above-described problems and an object of the present invention is to provide a pneumatic tire suitable for a high performance vehicle, in which wet condition drainage ability, controlling stability and tire wear resistance can be altogether improved without detracting from other tire properties.

In a first aspect of the present invention, a pneumatic tire for mounting to a wheel and supporting a vehicle above a surface, the tire comprises a tread having opposite edges and a surface contact portion when the tire is supporting a vehicle.

The tread includes: (a) a central circumferential main groove extending circumferentially around the tire and dividing the surface contact portion substantially into two equal halves; (b) an inboard side area extending from the central circumferential main groove towards the inboard side tread edge when the tire is supporting a vehicle, the tread having a negative ratio from 34% to 39% in the inboard side area; and (c) an outboard side area extending from the central circumferential main groove towards the outboard side tread edge when the tire is supporting a vehicle.

The tread has in the outboard side area: (i) a negative ratio from 35% to 37%; (ii) a plurality of lateral main grooves, each lateral main groove having a beginning end opening into the central circumferential main groove and slanting away from the central circumferential main groove at a first angle relative to the tire circumferential direction, to an opposite end opening at the outboard side area tread edge, the first angle being in a range of 55° to 90° and increasing in a direction along each lateral main groove towards the outboard side area tread edge, adjacent lateral main grooves being spaced from 45 mm to 50 mm from one another along the tire circumferential direction, and each lateral main groove having a width from 6 mm to 10 mm, with its beginning end located further toward a direction of rotation of the tire relative to the opposite end when the tire is rolling forwardly as used on a vehicle; (iii) a plurality of slanted longitudinal main grooves, each slanted longitudinal groove having a beginning end opening into a lateral main groove and extending at a second angle relative to the tire circumferential direction, at least to a terminating end in a vicinity of the outboard tread edge, the beginning end being located further toward the direction of rotation of the tire relative to the terminating end of the slanted longitudinal groove when the tire is rolling forwardly as used on a vehicle, the second angle being in the range of 5° to 50° and increasing in a direction along each slanted longitudinal groove towards the outboard area tread edge, each slanted longitudinal groove intersecting a plurality of lateral main grooves, with at least three intersections, the at least three intersections nearest or at the beginning end of the slanted longitudinal groove being located 9% to 35% of a width of the surface contact portion from the central circumferential main groove, in the outboard direction, each slanted longitudinal main groove having at each of the at least three intersections a width of 50% to 120% of the width of the beginning end of the lateral main groove which opens into the central circumferential main groove; and (iv) a plurality of land portions each separated from one another by the slanted longitudinal and lateral main grooves.

The present aspect provides the following excellent effects:

a) During high speed running along a wet road surface, water at the ground contact center line is drained in a tire forward direction. Because the central circumferential main groove is disposed at the ground contact center line so as to extend along the tire circumference direction (practically the same direction as the tire forward direction), the water at the ground (surface) contact center line can be efficiently drained from inside the ground contact area with little drag from water.

b) Water in the vicinity of the ground contact center is drained substantially in the tire forward direction or at a slight angle (5° to 30°) to the tire forward direction. In the present aspect, the outboard side slanted longitudinal main grooves are provided in the tread such that a ground contact center line end thereof opens into one of the outboard side lateral main grooves, another end of the outboard side slanted longitudinal main groove extends to an outboard side tread edge vicinity, and the angle of the outboard side slanted longitudinal main groove with respect to the tire circumferential direction gradually increases in a range 5° to 50° from the ground contact center line to the outboard side tread edge. Moreover, at least the first three intakes of the outboard side slanted longitudinal main groove, as counted from the ground contact center line end, open into corresponding outboard side lateral main grooves within an area of 9–35% of the ground contact width in the outboard side area. Each outboard side lateral main groove and each outboard side slanted longitudinal main groove is slanted such that the ground contact center line side thereof is disposed further toward a tire rotation direction than the tread edge side thereof. Consequently, water in the vicinity of the ground contact center can be drained very effectively.

c) At the opening portions of the outboard side slanted longitudinal main grooves into the outboard side lateral main grooves, the groove width, at least of the opening portions through to the third intake counting from the ground contact center line toward the ground contact edge, is 50% to 120% of the groove width of the inboard lateral main groove openings into the central main groove. Therefore, water can be drained from the central circumferential main groove to the tire axial direction outer side very effectively.

d) The negative ratio in the inside area of the tread is in the range 34% to 39%, and the negative ratio in the outside area of the tread is in the range 35% to 37%. Accordingly, wear resistance and controlling stability are assured.

e) Because one end of each outboard side lateral main groove opens into the central circumferential main groove, another end of each outboard side slanted lateral main groove opens at an outboard side tread edge, and the angle of each outboard side lateral main groove with respect to the tire circumferential direction increases, within a range 55° to 90°, from the ground contact center line side to the outboard side tread edge side, water in the vicinity of the ground contact center can be drained very effectively.

Because of the above-described effects, wet condition drainage ability, controlling stability and tire wear resistance can be altogether improved in a pneumatic tire based on the present aspect.

In a second aspect of the present invention, a pneumatic tire for mounting to a wheel and supporting a vehicle above a surface, the tire comprising a tread having opposite edges and a surface contact portion when the tire is supporting a vehicle.

The tread includes: (a) a central circumferential main groove extending circumferentially around the tire and dividing the surface contact portion substantially into two equal halves; (b) an outboard side area extending from the central circumferential main groove towards the outboard side tread edge when the tire is supporting a vehicle, the tread having in the outboard side area a negative ratio from 35% to 37%; and (c) an inboard side area extending from the central circumferential main groove towards the inboard side tread edge when the tire is supporting a vehicle.

The tread has in the inboard side area: (i) a negative ratio from 34% to 39%; (ii) at least one inboard side circumferential main groove extending circumferentially around the tire between the central circumferential main groove and the inboard side area tread edge; (iii) a plurality of lateral main grooves, each lateral main groove having a beginning end opening into the central circumferential main groove and slanting away from the central circumferential main groove at a first angle relative to the tire circumferential direction, to an opposite end opening at the inboard side area tread edge, the first angle increasing in a range from 55° to 90° in a direction along each lateral main groove towards the inboard side area tread edge, adjacent lateral main grooves being spaced from 45 mm to 50 mm from one another along a direction of the tire circumferential direction, and each lateral main groove having a width from 6 mm to 10 mm, with its beginning end located further toward a direction of rotation of the tire relative to the opposite end when the tire is rolling forwardly as used on a vehicle; and (iv) a plurality of land portions each separated from one another by the lateral main grooves and the circumferential main grooves, each land portion having a plurality of vertices, with one vertex positioned further toward the tire direction rotation when the tire is rolling forwardly as used on a vehicle, relative to the other vertices of the land portion, with each land portion adjacent to the central circumferential main groove, having a width measured along a transverse direction of the tire, of 20% to 30% of a width of the half of the surface contact portion in the inboard side area, and having the one vertex having an acute angle from 55° to 70°.

In addition to the effects a) through d) described above, the present aspect provides the following excellent effect:

f) One end of each inboard side lateral main groove opens into the central circumferential main groove, another end of each inboard side lateral main groove opens at an inboard side tread edge (vicinity), and the angle of each inboard side lateral main groove with respect to the tire circumferential direction increases, within a range 55° to 90°, from the ground contact center line side to the inboard side tread edge side. Consequently, water in the vicinity of the ground contact center can be drained very effectively by the inboard side lateral main grooves toward the inboard side tread edge (as in item e) above).

Because of the above-described effects, wet condition drainage ability, controlling stability and tire wear resistance can be altogether improved in a pneumatic tire based on the present aspect.

In a third aspect of the present invention, a pneumatic tire of the present invention is used on a front wheel of a vehicle. That is, the characteristics of the present invention can be most remarkably achieved by using pneumatic tires based on the present invention on the front wheels of vehicles.

In a fourth aspect of the present invention, a pneumatic tire based on one of the above aspects is mounted for use on a vehicle with wheel alignment settings such that a toe angle is in a toe-in range 0° to 0.7° and a camber angle is in a negative camber range 0° to 5°.

That is, the characteristics of the present invention can be most remarkably achieved by using a pneumatic tire based on the present invention mounted on a vehicle with wheel alignment settings such that the toe angle is in the toe-in range 0° to 0.70 and the camber angle is in the negative camber range 0° to 5°.

BRIEF DESCRIPTION OF THE DRAWINGS

FIG. 2 is an expanded view of tread of a conventional pneumatic tire.

DESCRIPTION OF THE PREFERRED EMBODIMENTS

Figure 1:
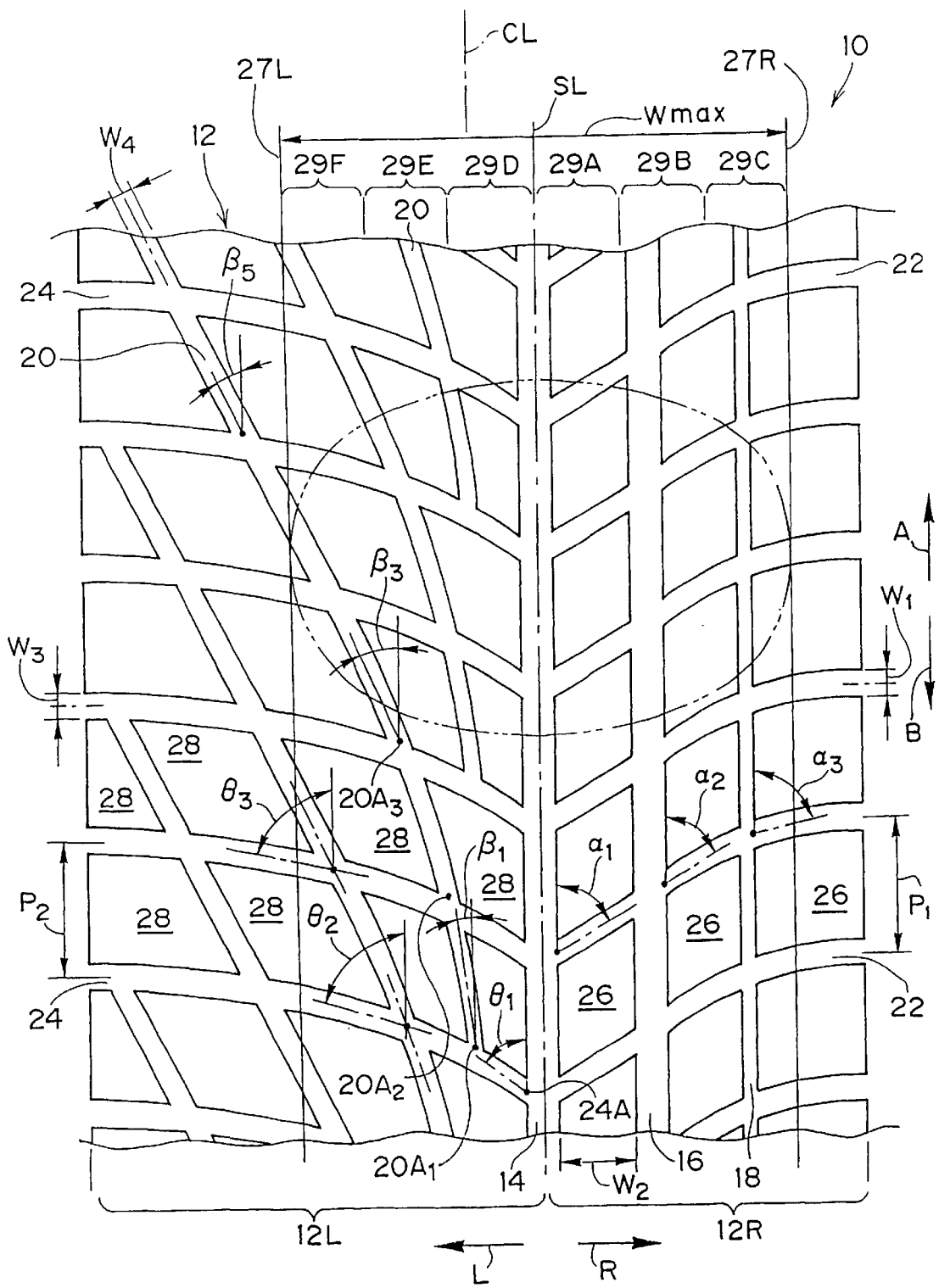
FIG. 1 is an expanded view of tread of a pneumatic tire relating to an embodiment of the present invention.

First, we provide following definitions of some particular terms employed in the present specification.

"Inboard side" means the side of the tire which is nearest to the vehicle when the tire is mounted on a wheel and the wheel is mounted on the vehicle.

"Outboard side" means the side of the tire furthest away from the vehicle when the tire is mounted on a wheel and the wheel is mounted on the vehicle.

"Negative ratio" means a value which is obtained by dividing the total non-ground (surface) contacting area (grooves and the like) between the lateral edges around the entire circumference of the tread the gross area of the entire tread between the lateral edges.

An embodiment of the pneumatic tire of the present invention will be explained with reference to FIG. 1.

As shown in FIG. 1, a central circumferential main groove 14 is formed in tread 12 of a pneumatic tire 10 of the present embodiment (tire size: 245/55R13). The central circumferential main groove 14 extends along a circumferential direction of the tire (in the directions indicated by arrows A or B), along a ground contact center line SL that equally bisects ground contact width Wmax in a tire axial direction (in the directions indicated by arrows L and R). (A dotted line in FIG. 1 shows a ground contact region.)

This pneumatic tire 10 is for a front-right wheel of a vehicle. When the vehicle moves forward, the pneumatic tire 10 rotates in the direction of arrow B. The side of the tread 12 indicated by arrow L in FIG. 1 is at a vehicle outboard side, and the side of the tread 12 indicated by arrow R is at a vehicle inboard side.

It is assumed that the pneumatic tire 10 is fitted for use on a vehicle with wheel alignment settings such that the toe angle is in a toe-in range of 0° to 0.7° and the camber angle is in a negative camber range of 0° to 5°.

Because the pneumatic tire 10 is used with a negative camber angle, when the pneumatic tire 10 is attached to the vehicle, the ground contact center line SL is displaced further toward the vehicle inboard side (the direction of arrow R) than a tire equatorial plane CL.

Details of the Inboard Side Area 12R of Tread 12

An inboard side area 12R is the area of tread 12 that is at the vehicle inboard side of the ground contact center line SL (the part at the side indicated by arrow R in FIG. 1). The inside area 12R is divided into a plurality of land portions 26 by a first inboard side circumferential main groove 16, a second inboard side circumferential main groove 18 and a plurality of inboard side (gently-slanted) lateral main grooves 22. The first inboard side circumferential groove 16 and the second inboard circumferential groove 18 extend along the tire circumferential direction. Each inboard side lateral main groove 22 (which may be referred to as "inboard lateral groove" hereinafter) opens into the central circumferential main groove 14 and an arrow R side ground contact edge 27R. Toward the ground contact center line SL each inboard lateral groove 22 slants in the direction of rotation (the direction of arrow B). Each inboard lateral groove 22 forms a relatively large angle α with respect to the tire circumferential direction.

It is preferable that the angle α that each inboard lateral groove 22 forms with respect to the tire circumferential direction gradually increases, within the range 55° to 90°, from the ground contact center line SL to the ground contact edge 27R.

When the area between the ground contact center line SL and the ground contact edge 27R is divided into three regions with substantially equal width in the tire axial direction: a ground contact center region 29A; a middle region 29B; and a ground contact edge region 29C, an angle α1 of each inboard lateral groove 22 in the ground contact center region 29A is preferably in the range 55° to 70°, an angle α2 of each inboard lateral groove 22 in the middle region 29B is preferably in the range 55° to 70°, and an angle α3 of each inboard lateral groove 22 in the ground contact edge region 29C is preferably in the range 70° to 90°.

In a particular example of the present embodiment as shown in FIG. 1, the angle α1 of each inboard lateral groove 22 at a portion toward the right of FIG. 1 from the central circumferential main groove 14 is 57°, the angle α2 of each inboard lateral groove 22 at a portion toward the right of FIG. 1 from the first inboard side circumferential main groove 16 is 57°, and the angle α3 of each inboard lateral groove 22 at a portion toward the right of FIG. 1 from the second inboard side circumferential main groove 18 is 72°.

A spacing P1 of the inboard lateral grooves 22 in the tire circumferential direction is preferably in the range 45 mm to 50 mm. In the present embodiment, the spacing P1 is 46.5 mm.

A groove width W1 of each inboard lateral groove 22 (measured in a direction orthogonal to a center line of the groove) is preferably in the range 6 mm to 10 mm. In the present embodiment, the groove width W1 of each inboard lateral groove 22 is 9 mm.

A negative ratio in the inside area 12R is preferably 34% to 39%. In the present embodiment, the negative ratio in the inside area 12R is 38.4%.

A leading-in side (arrow B side) of each of the land portions 26 in the inside area 12R that are closest to the ground contact center line SL has an acute angle portion. The angle of each acute angle portion is preferably 55° to 70°. In the present embodiment, this angle is 57° (α1).

Each of the land portions 26 in the inside area 12R that are closest to the ground contact center line SL has a width W2 in the tire axial direction. The width W2 is preferably 20% to 30% of an inside area 12R ground contact width measured in the tire axial direction (0.5×Wmax). In the present embodiment, the width W2 is 31% of the inside area 12R ground contact width (0.5×Wmax).

Details of the Outboard Side Area 12L of Tread 12

An outboard side area, which is the area of tread 12 that is at the vehicle outboard side of the ground contact center line SL (the part at the side indicated by arrow L in FIG. 1), is an outboard side area 12L. The outboard side area 12L is divided into a plurality of land portions 28 by a plurality of outboard side (slanted) lateral main grooves 24 and a plurality of outboard side slanted longitudinal main grooves 20. Each outboard side lateral main groove 24 (which may be referred to as "outboard lateral groove" hereinafter) forms a relatively large angle with respect to the tire circumferential direction. Each outboard side slanted longitudinal main groove 20 (which may be referred to as "outboard longitudinal groove" hereinafter) forms a smaller angle with respect to the tire circumferential direction than the outboard lateral grooves 24.

The outboard lateral groove 24 opens into the central circumferential main groove 14 and an arrow L side ground contact edge 27L. It is preferable that the angle that each outboard lateral groove 24 forms with respect to the tire circumferential direction gradually increases, within the range 55° to 90°, from the ground contact center line SL to the ground contact edge 27L.

The area between the ground contact center line SL and the ground contact edge 27L can be considered as if divided into three regions in the tire axial direction: a ground contact center region 29D; a middle region 29E; and a ground contact edge region 29F. In this case, an angle θ1 of each outboard lateral groove 24 in the ground contact center region 29D is preferably in the range 55° to 65°, an angle θ2 of each outboard lateral groove 24 in the middle region 29E is preferably in the range 70° to 80°, and an angle θ3 of each outboard lateral groove 24 in the ground contact edge region 29F is preferably in the range 80° to 90°.

In the present embodiment, the angle θ1 of each outboard lateral groove 24 at a portion toward the left of FIG. 1 from the central circumferential main groove 14 is 56°, the angle θ2 of each outboard lateral groove 24 at a third intersection (opening portion) along one of the outboard longitudinal grooves 20 (counting towards the outboard end of the outboard longitudinal groove 20, with the intersection thereof that is closest to the central circumferential main groove 14 being a first intersection) is 73°, and the angle θ3 of each outboard lateral groove 24 at a fourth intersection along one of the outboard longitudinal grooves 20 is 82°. In FIG. 1, θ1 and θ2 are shown for one outboard lateral groove 24 and θ2 and θ3 are shown for one outboard longitudinal groove 20, but this is simply for ease of understanding the drawing.

A spacing P2 of the outboard lateral grooves 24 in the tire circumferential direction is preferably in the range 45 mm to 50 mm. In the present embodiment, the spacing P2 is 46.5 mm.

Groove width W3 of each outboard lateral groove 24 is preferably in the range 6 mm to 10 mm. In the present embodiment, the groove width W3 of each outboard lateral groove 24 is 8 mm at a ground contact center line SL end portion thereof and 8.5 mm at an outboard end portion thereof.

Each outboard longitudinal groove 20 extends from a ground contact center line SL end thereof, which opens into one of the outboard lateral grooves 24, through the ground contact edge 27L, to a vicinity of an outboard end of the tread 12.

Land area is divided up into groups of land portions 28 aligned laterally between two adjacent outboard side slanted lateral main grooves 24. In the present embodiment, spacing of the outboard longitudinal grooves 20 is fixed such that there are four land portions 28 in each lateral group between adjacent outboard lateral grooves 24.

If the spacing of the outboard longitudinal grooves 20 is too narrow, the number of land portions 28 in each lateral group between adjacent outboard lateral grooves 24 will be too large and land ground contact area will be too small. Moreover, the size of each land portion 28 would be too small, and wear resistance and controlling stability will be reduced.

If the spacing of the outboard longitudinal grooves 20 is too wide, the number of outboard lateral grooves 24 in the ground contact region will be too small and drainage ability will be reduced.

Therefore, it is preferable that the outboard longitudinal grooves 20 are provided such that there are three or four land portions 28 in each lateral group between adjacent outboard lateral grooves 24.

Each outboard longitudinal groove 20 has openings into the outboard lateral grooves 24 in the tire rotation direction. (Water in the ground contact region enters the grooves from the tire rotation direction through these openings. Therefore, the openings are referred to hereafter as "intakes 20A".) Each outboard lateral groove 24 has a central circumferential main groove opening 24A into the central circumferential main groove 14. Each central circumferential main groove opening 24A has width W3. Each intake 20A has width W4. The width W4, at least of intakes 20A from the ground contact center line SL through to the third intake counting toward the ground contact edge 27L, is preferably 50% to 120% of the width W3. It is preferable that the groove width W4 of each outboard longitudinal groove 20 gradually increases from the ground contact center line SL toward the outboard end of the tread 12.

Counting from the ground contact center line SL, an intake 20A1 is the first intake 20A of each outboard longitudinal groove 20, an intake 20A2 is the second intake 20A of the same, and an intake 20A3 is the third intake 20A of the same. In the present embodiment, width W4 of each intake 20A1 is 61% of the width W3 of the central circumferential main groove openings 24A, width W4 of each intake 20A2 is 89% of the same, and width W4 of each intake 20A3 (and any further intakes 20A toward the ground contact edge 27L) is 100% of the same.

It is preferable that the angle β that each outboard longitudinal groove 20 forms with respect to the tire circumferential direction gradually increases, within the range 5° to 50°, from the ground contact center line SL to the ground contact edge 27L.

In the present embodiment, the angle β1 of each outboard longitudinal groove 20 at the intake 20A1 is 5°, the angle β3 of the outboard longitudinal groove 20 at the intake 20A3 is 21°, and the angle β5 of the outboard longitudinal groove 20 at the fifth intake 20A, counting from the ground contact center line SL, is 27°.

In the present embodiment, groove depth of all of the central circumferential main groove 14, the first inboard circumferential groove 16, the second inboard circumferential groove 18, the outboard lateral grooves 24, the inboard lateral grooves 22 and the outboard longitudinal grooves 20 is 6 mm.

The pattern shown in FIG. 1 is used for a front-right wheel. Patterns for a front-left wheel are similar to those for the front-right wheel but formed opposite in hand.

Action of the Present Invention

Next, effects which can be achieved by the use of the pneumatic tire 10 of the present embodiment will be explained.

(1) During high speed running along a wet road surface, water at the ground contact center line SL is drained in a tire forward direction. Because the central circumferential main groove 14 is disposed at the ground contact center line SL extending along the tire circumference direction (practically the same direction as the tire forward direction), the water at the ground contact center line SL can be efficiently drained from inside the ground contact area with little drag from water.

When the pneumatic tire 10 is used on a vehicle, camber is applied to the pneumatic tire 10. Therefore, the ground contact center line SL and the tire center line (the tire equatorial plane CL) do not necessarily coincide.

Particularly when the tread 12 of the pneumatic tire 10 is wide, effective drainage of water is required at the area that is the most difficult to drain: that is, the vicinity of the ground contact center line SL. Because the central circumferential main groove 14 is disposed extending along the tire circumferential direction at the ground contact center line SL, drainage can be performed more effectively than if the central circumferential main groove 14 is disposed at the tire equatorial plane CL.

(2) Water in the vicinity of the ground contact center is drained substantially in the tire forward direction or at a slight angle (5° to 30°) to the tire forward direction.

In the present embodiment, the outboard longitudinal grooves 20 are provided in the tread 12 such that a ground contact center line SL end of each outboard longitudinal groove 20 opens into one of the outboard lateral grooves 24, another end of the outboard longitudinal groove 20 extends to an outboard side tread edge vicinity, and the angle of the outboard longitudinal groove 20 with respect to the tire circumferential direction gradually increases from the ground contact center line SL to the outboard side tread edge. Moreover, each of the first three intakes of the outboard longitudinal groove 20, as counted from the ground contact center line SL end, opens into a corresponding outboard lateral groove 24 within a distance of 9% to 35% of a half of the ground contact width Wmax, from the central circumferential main groove 14 toward the outboard side. Consequently, water in the vicinity of the ground contact center can be drained very effectively.

If the angle of the outboard longitudinal grooves 20 with the tire circumferential direction is outside the range 5° to 50°, water in the vicinity of the ground contact center cannot be drained very effectively. Similarly, if the first three intakes of the outboard longitudinal groove 20 does not open into the outboard lateral groove 24 at a distance ranging from 9% to 35% of the ground contact half-width from the central circumferential main groove 14 at the ground contact center line SL toward the tire axial direction outer side, water in the vicinity of the ground contact center cannot be drained very effectively.

(3) At the intakes 20A of the outboard longitudinal grooves 20 into the outboard lateral grooves 24, the groove width W4, at least of the intakes 20A through to the third intake counting from the ground contact center line SL toward the ground contact edge 27L, is 50% to 120% of the groove width W3 of the central circumferential main groove openings 24A of the outboard lateral grooves 24 into the central circumferential main groove 14. Therefore, water can be drained from the central circumferential main groove 14 to the tire axial direction outer side very effectively.

If the groove width W4 of the above-specified intakes 20A is less than 50% of the groove width W3, water cannot be drained from the central circumferential main groove 14 to the tire axial direction outer side very effectively.

On the other hand, if the groove width W4 of the above-specified intakes 20A is more than 120% of the groove width W3, land area will be reduced, and wear resistance and controlling stability will be reduced.

(4) The negative ratio in the inside area 12R of the tread 12 is in the range 34% to 39%, and the negative ratio in the outside area 12L of the tread 12 is in the range 35% to 37%. Accordingly, wear resistance and controlling stability are assured.

If the negative ratios were higher than the above-described ratios, wear resistance and controlling stability would be reduced. On the other hand, if the negative ratios were lower than the above-described ratios, drainage ability, i.e., wet condition performance, would be reduced.

Therefore, to provide excellent wet condition performance and, therewith, wear resistance and controlling stability, the negative ratios must be set to within the above-described ranges.

(5) If the spacing P2 of the outboard lateral grooves 24 in the tire circumferential direction is less than 45 mm, the land area of the outside area 12L will be reduced, and wear resistance and controlling stability will be reduced. On the other hand, if the spacing P2 of the outboard lateral grooves 24 in the tire circumferential direction is more than 50 mm, drainage ability will be reduced, and wet condition performance will be impaired.

(6) If the groove width W3 of the outboard lateral grooves 24 is less than 6 mm, drainage ability will be reduced, and wet condition performance will be impaired. On the other hand, if the groove width W3 of the outboard lateral grooves 24 is more than 10 mm, the land area of the outside area 12L will be reduced, and wear resistance and controlling stability will be reduced.

(7) In the inside area 12R, the inboard lateral grooves 22 are provided such that a ground contact center line SL end of each inboard lateral groove 22 opens into the central circumferential main groove 14, another end of the inboard lateral groove 22 extends to an inboard side tread edge vicinity, and the angle α of the inboard lateral groove 22 with respect to the tire circumferential direction gradually increases from the central circumferential main groove 14 to the inboard side tread edge. Consequently, water in the vicinity of the ground contact center can be drained very effectively.

If the angle of the inboard lateral grooves 22 with the tire circumferential direction is outside the range 55° to 90°, water in the vicinity of the ground contact center cannot be drained very effectively.

(8) If the spacing P1 of the inboard lateral grooves 22 in the tire circumferential direction is less than 45 mm, the land area of the inside area 12R will reduced, and wear resistance and controlling stability will be reduced. On the other hand, if the spacing P1 of the inboard lateral grooves 22 in the tire circumferential direction is more than 50 mm, drainage ability will be reduced, and wet condition performance will be impaired.

(9a) If the groove width W1 of the inboard lateral grooves 22 is less than 6 mm, drainage ability will be reduced, and wet condition performance will be impaired. On the other hand, if the groove width W1 of the inboard lateral grooves 22 is more than 10 mm, the land area of the inside area 12R will be reduced, and wear resistance and controlling stability will be reduced.

(9b) When the vehicle is cornering, with tires with a negative camber applied thereto mounted on the vehicle, a load at an inboard side area of each tread is increased. Hence, the shapes of land portions disposed at the inboard side area of the tread may be deformed, resulting in changes in the tread areas thereof. Thus, irregular wear may be caused at surfaces of those land portions located at the inboard side area by lateral forces that act during cornering. Consequently desired grip may be unobtainable, and controlling stability may be reduced.

In the pneumatic tire 10 of the present embodiment, the inside area 12R is divided into three land portions with substantially equal width in the axial direction of the tire by the first inner circumferential groove 16 and the second inner circumferential groove 18. Moreover, the tire circumferential direction is divided into equal segments by the equally spaced plurality of inboard lateral grooves 22. Therefore, the shapes and areas of the land portions 26 are substantially equal. Further, the angle α of each inboard lateral groove 22 with respect to the tire circumferential direction is in the range 55° to 90°, and the angle (α1) of the acute angle portion of the leading-in side (the tire rotation direction side) of each of the land portions 26 that are closest to the ground contact center line SL is 57°. Thus, causation of irregular wear on the surfaces of the land portions in the inside area 12R by lateral forces during cornering is suppressed. Consequently, high controlling stability can be continuously maintained.

Because of the reasons listed in (1) to (9b), the pneumatic tire 10 of the present embodiment can provide wet condition performance and also wear resistance and controlling stability, particularly when used on the front wheels of the vehicle. These characteristics are maximally effected when the wheel alignment is set such that the toe angle is in the range from 0° to 0.7° of toe-in and the camber is in the range from 0° to 5° of negative camber.

Other Embodiments

In the embodiment described above, the groups of land portions 28 aligned laterally between two adjacent outboard side slanted lateral grooves 24 are formed in the outside area 12L of the tread 12. Two types of lateral land portion row, having different patterns, are disposed alternately along the tire circumferential direction. Instead of this, however, three types of lateral land portion row having different patterns could be disposed in a repeating manner along the tire circumferential direction.

Also, in the embodiment described above, the central circumferential main groove 14 is provided at the ground contact center line SL. Instead of this, however, the central circumferential main groove 14 could be slightly offset from the ground contact center line SL. In such a case, the offset of the groove center line of the central circumferential main groove 14 from the ground contact center line SL in the tire axial direction would preferably be less than 40 mm, more preferably less than 35 mm, and even more preferably less than 30 mm.

Also, the tire size of the pneumatic tire 10 in the embodiment described above was 245/55R13. The present invention is, of course, applicable for other tire sizes as well. However, the effects of the present invention are maximally effected for wide tires, and the present invention is particularly preferably applied to tires whose tread 12 is at least 225 mm wide (and more preferably at least 245 mm wide).

Further, the pneumatic tire 10 of the embodiment described above is for a front wheel, but may also be used on a rear wheel.

Examples

To confirm the effects of the present invention, a Comparative Example, which was a conventional tire, and an Example, which was a tire using the present invention, were prepared and mounted at the front wheels of an actual vehicle. Hydroplaning, best lap time and average lap time over ten laps were measured for each tire. After a predetermined running distance, irregular wear characteristics (heel and toe) and wet grip were examined. At the rear wheels of the vehicle, dedicated rear wheel tires (not the tires being tested) were mounted.

The Example tire was the pneumatic tire 10 (for front wheels) of the embodiment.

Figure 2:
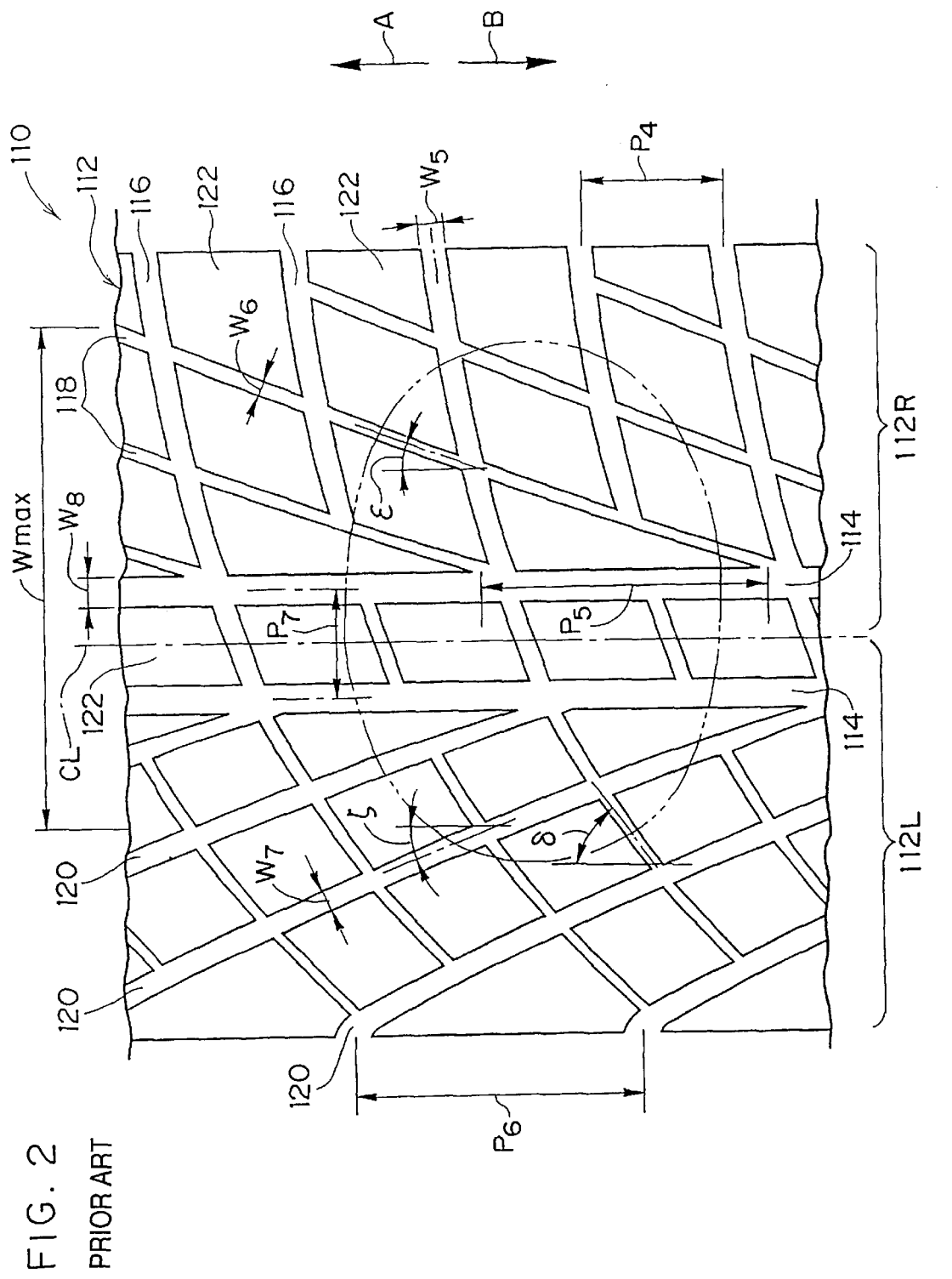

The conventional tire was a pneumatic tire 110 with a tread 112 having the pattern shown in FIG. 2. The conventional pneumatic tire 110 is described below.

As shown in FIG. 2, circumferential main grooves 114 extending along the tire circumferential direction are formed at both sides of a tire equatorial plane CL in the tread 112 of the conventional pneumatic tire 110.

The ground contact width is Wmax. (In FIG. 2, the shape of the ground contact area is shown by a dotted line.)

The pneumatic tire 110 is used on the front-right wheel of a vehicle. When the vehicle advances, the pneumatic tire 110 rotates in the direction of arrow B. The direction of arrow L is at the vehicle outboard side and the direction of arrow R is at the vehicle inboard side.

In the tread 112, a plurality of (slanted) lateral grooves 116 (which will be referred to as "lateral grooves 116" hereinafter), a plurality of inboard side slanted longitudinal grooves 118 (which will be referred to as "inboard longitudinal grooves" hereinafter), and a plurality of outboard side slanted longitudinal grooves (which will be referred to as "outboard longitudinal grooves" hereinafter) 120 are provided. The lateral grooves 116 extend from the tire outer side to the tire inner side, slanted such that tire outer side portions thereof are positioned further toward the tire rotation direction than tire inner side portions thereof. The inboard longitudinal grooves 118 are provided at an inside area 112R which is an area at the inboard side of the tire equatorial plane CL. A tire equatorial plane CL side of the inboard longitudinal grooves 118 is slanted along the tire rotation direction (the direction of arrow B). One end of each inboard longitudinal groove 118 opens into one of the circumferential main grooves 114 and another end of the inboard longitudinal groove 118 opens into one of the lateral grooves 116 in the vicinity of an inboard side tread end thereof. The angle of the inboard longitudinal groove 118 with respect to the tire circumferential direction is relatively small. The outboard longitudinal grooves 120 are provided at an outside area 112L which is an area at the outboard side of the tire equatorial plane CL. A tire equatorial plane CL side of the outboard longitudinal grooves 120 is slanted along the tire rotation direction (the direction of arrow B). One end of each outboard longitudinal groove 120 opens into one of the circumferential main grooves 114 and another end of the outboard longitudinal groove 120 opens out at an outboard side tread end. The angle of the outboard longitudinal groove 120 with respect to the tire circumferential direction is relatively small. The lateral grooves 116, the inboard longitudinal grooves 118 and the outboard longitudinal grooves 120 form a plurality of land portions 122.

A groove width W5 of the lateral grooves 116 increases (from 4 mm to 8 mm) from the outboard side to the inner side. An angle δ of the lateral grooves 116 with respect to the tire circumferential direction gradually increases (from 75° to 85°) from the outboard side to the inboard side. A spacing P4 of the lateral grooves 116 along the tire circumferential direction is 45 mm.

A groove width W6 of the inboard longitudinal grooves 118 increases stepwisely (from 4 mm to 5 mm) from the outboard side to the inboard side. An angle ε of the inboard longitudinal grooves 118 with respect to the tire circumferential direction gradually increases (from 20° to 25°) from the outboard side to the inboard side. A spacing P5 of the inboard longitudinal grooves 118 along the tire circumferential direction is 90 mm.

A groove width W7 of the outboard longitudinal grooves 120 increases stepwisely (from 5.5 mm to 5.8 mm) from the inboard side to the outboard side. An angle ξ of the outboard longitudinal grooves 120 with respect to the tire circumferential direction gradually increases (from 18° to 27°) from the inboard side to the outboard side. A spacing P6 of the outboard longitudinal grooves 120 along the tire circumferential direction is 90 mm.

A groove width W8 of the circumferential direction grooves 114 is 10 mm. A spacing P7 of the circumferential direction grooves 114 is 36 mm.

All of the circumferential main grooves 114, the lateral grooves 116, the inboard longitudinal grooves 118 and the outboard longitudinal grooves 120 have groove depths of 6 mm. A negative ratio of the outside area 112L is 31.4%, and a negative ratio of the inside area 112R is 31.6%.

The pattern shown in FIG. 2 is for a front-right wheel. Patterns and nomenclature for a front-left wheel are formed opposite in hand relative to those shown in FIG. 2.

Items to be tested are explained as follows.

Hydroplaning: A speed at which hydroplaning start to occur was measured on a wet road surface with a water depth of 2 mm. For evaluation, the result was expressed as an index using the result of the conventional tire as the control which was set at 100. A higher index shows a higher speed at which hydroplaning occurs.

Lap time: Lap times of circuits on a wet road surface with a water depth of 2 mm (a proving ground) were measured. For evaluation, the result was expressed as an index using the result of the conventional tire as the control which was set at 100. A lower index shows a shorter lap time.

Irregular wear: The degree of heel and toe wear was measured after circuits of the wet road surface with water depth of 2 mm (the test course). For evaluation, the result was expressed as an index using the result of the conventional tire as the control which was set at 100. A lower index shows less irregular wear.

Wet grip: After circuits of the wet road surface with water depth of 2 mm (the test course), the test driver gave a judgement of how the grip felt. For evaluation, the result was expressed as an index using the result of the conventional tire as the control which was set at 100. A higher index shows better grip.

TABLE 1

|  | Comparative Example | Example |
| --- | --- | --- |
| Hydroplaning | 100 | 120 |
| Lap time (best) | 100 | 97 |
| Lap time (average) | 100 | 85 |
| Irregular wear | 100 | 95 |
| Wet grip | 100 | 110 |

As can be seen from the test results, the Example tire using the present invention was better than the conventional tire in every respect.

As described above, the pneumatic tire of the present invention with the aforementioned structure has excellent effects in that tire wear resistance can be improved and drainage ability at the wet condition and controlling stability can be improved without detracting from other tire properties.

What is claimed is:

1. A pneumatic tire for mounting to a wheel and supporting a vehicle above a surface, the tire comprising a tread having opposite edges and a surface contact portion when the tire is supporting a vehicle, the tread including:
   (a) a central circumferential main groove extending circumferentially around the tire and dividing the surface contact portion substantially into two equal halves;
   (b) an inboard side area extending from the central circumferential main groove towards the inboard side tread edge when the tire is supporting a vehicle, the tread having a negative ratio from 34% to 39% in the inboard side area; and
   (c) an outboard side area extending from the central circumferential main groove towards the outboard side tread edge when the tire is supporting a vehicle, the tread having in the outboard side area:
      (i) a negative ratio from 35% to 37%;
      (ii) a plurality of lateral main grooves, each lateral main groove having a beginning end opening into the central circumferential main groove and slanting away from the central circumferential main groove at a first angle relative to the tire circumferential direction, to an opposite end opening at the outboard side area tread edge, the first angle being in a range of 55° to 90° and increasing in a direction along each lateral main groove towards the outboard side area tread edge, adjacent lateral main grooves being spaced from 45 mm to 50 mm from one another along the tire circumferential direction, and each lateral main groove having a width from 6 mm to 10 mm, with its beginning end located further toward a direction of rotation of the tire relative to the opposite end when the tire is rolling forwardly as used on a vehicle;
      (iii) a plurality of slanted longitudinal main grooves, each slanted longitudinal groove having a beginning end opening into a lateral main groove and extending at a second angle relative to the tire circumferential direction, at least to a terminating end in a vicinity of the outboard tread edge, the beginning end being located further toward the direction of rotation of the tire relative to the terminating end of the slanted longitudinal groove when the tire is rolling forwardly as used on a vehicle, the second angle being in the range of 5° to 50° and increasing in a direction along each slanted longitudinal groove towards the outboard area tread edge, each slanted longitudinal groove intersecting a plurality of lateral main grooves, with at least three intersections, the intersection of the at least three intersections nearest or at the beginning end of the slanted longitudinal groove being located 9% to 35% of a width of the surface contact portion from the central circumferential main groove, in the outboard direction, each slanted longitudinal main groove having at each of the at least three intersections a width of 50% to 120% of the width of the beginning end of the lateral main groove which opens into the central circumferential main groove; and
      (iv) a plurality of land portions each separated from one another by the slanted longitudinal and lateral main grooves,
   wherein said inboard side area does not contain any of said slanted longitudinal main grooves.

2. The pneumatic tire of claim 1, wherein the half of the surface contact portion in the outboard side area has three regions, the three regions lying in a side-by-side relationship in the transverse tire direction, with each region being approximately ⅓ of the width of the half of the surface contact portion in the outboard side area, the first angle being in a range from 55° to 65° in the region nearest the central circumferential main groove, 70° to 80° in the region adjacent the first region, and 80° to 90° in the region nearest the outboard tread edge.

3. A pneumatic tire for mounting to a wheel and supporting a vehicle above a surface, the tire comprising a tread having opposite edges and a surface contact portion when the tire is supporting a vehicle, the tread including:
   (a) a central circumferential main groove extending circumferentially around the tire and dividing the surface contact portion substantially into two equal halves;
   (b) an inboard side area extending from the central circumferential main groove towards the inboard side tread edge when the tire is supporting a vehicle, the tread having in the inboard side area:
      (i) a negative ratio from 34% to 39%;
      (ii) at least one other circumferential main groove extending circumferentially around the tire between the central circumferential main groove and the inboard side area tread edge; and
      (iii) a plurality of lateral main grooves, each lateral main groove having a beginning end opening into the central circumferential main groove and slanting away from the central circumferential main groove at a first angle relative to the tire circumferential direction, to an opposite end opening at the inboard side area tread edge, the first angle increasing in a range from 55° to 90° in a direction along each lateral main groove towards the inboard side area tread edge; and
      (iv) a plurality of land portions each separated from one another by the lateral main grooves and the circumferential main grooves; and (c) an outboard side area extending from the central circumferential main groove away from the vehicle when the tire is supporting a vehicle, the tread having in the outboard side area:
  (i) a negative ratio from 35% to 37%;
  (ii) a plurality of lateral main grooves, each lateral main groove having a beginning end opening into the central circumferential main groove and slanting away from the central circumferential main groove at a second angle relative to the tire circumferential direction, to an opposite end opening at the outboard side area tread edge, the second angle increasing in a range from 55° to 90° in a direction along each lateral main groove towards the outboard side area tread edge, each lateral main groove having its beginning end located further toward a direction of rotation of the tire relative to the opposite end when the tire is rolling forwardly as used on a vehicle;
  (iii) a plurality of slanted longitudinal grooves, each slanted longitudinal groove having a beginning end opening into a lateral main groove and extending at a third angle relative to the tire circumferential direction, at least to a terminating end in a vicinity of the outboard tread edge, the beginning end being located further toward a direction of rotation of the tire relative to the terminating end of the slanted longitudinal groove when the tire is rolling forwardly as used on a vehicle, the third angle being in a range of 5° to 50° and increasing in a direction along each slanted longitudinal groove towards the outboard area tread edge, each slanted longitudinal groove intersecting a plurality of lateral main grooves, with at least three intersections, the intersection of the at least three intersections nearest or at the beginning end of the slanted longitudinal groove being located 9% to 35% of a width of the surface contact portion from the central circumferential main groove, in the outboard direction, each slanted longitudinal main groove having at each of the at least three intersections a width of 50% to 120% of the width of the beginning end of the lateral main groove which opens into the central circumferential main groove; and
  (iv) a plurality of land portions each separated from one another by the slanted longitudinal and lateral main grooves
  wherein said inboard side area does not contain any of said slanted longitudinal main grooves.

4. The pneumatic tire of claim 3, wherein the lateral main grooves are formed such that spacings thereof along the tire circumferential direction are in a range 45 mm to 50 mm, and groove widths thereof are in a range 6 mm to 10 mm.

5. The pneumatic tire of claim 3, wherein each land portion has a plurality of vertices, with one vertex positioned further toward the tire direction rotation when the tire is rolling forwardly as used on a vehicle, relative to the other vertices the land portion, with each land portion adjacent the central circumferential main groove, having a width measured along a transverse direction of the tire, of 20% to 30% of a width of the half of the surface contact portion in the inboard side area, and having the one vertex having an acute angle from 55° to 70°.

6. The pneumatic tire of claim 3, wherein the half of the surface contact portion in the outboard side area has three regions, the three regions lying in a side-by-side relationship in the transverse tire direction, with each region being approximately ⅓ of the width of the half of the surface contact portion in the outboard side area, the second angle being in a range from 55° to 65° in the region nearest the central circumferential main groove, 70° to 80° in the region adjacent the first region, and 80° to 90° in the region nearest the outboard tread edge.

7. The pneumatic tire of claim 3, wherein the half of the surface contact portion in the inboard side area has two regions, the first region lying adjacent the central circumferential main groove and extending substantially orthogonally away therefrom to approximately ⅔ of the width of the half of the surface contact portion in the inboard side area, the first angle being from 55° to 70° in the first region, the second region lying adjacent the first region and extending substantially orthogonally away therefrom for a distance of approximately ⅓ of the width of the half of the surface contact portion in the inboard side area, the first angle being 70° to 90° in the second region.

* * * * *